United States Patent
Warner et al.

(10) Patent No.: US 7,801,856 B2
(45) Date of Patent: Sep. 21, 2010

(54) USING XML FOR FLEXIBLE REPLICATION OF COMPLEX TYPES

(75) Inventors: James W. Warner, Sunnyvale, CA (US);
Zhen Hua Liu, San Mateo, CA (US);
Sundeep Abraham, Belmont, CA (US);
Muralidhar Krishnaprasad, Fremont, CA (US); Geeta Arora, Union City, CA (US); Ravi Murthy, Fremont, CA (US);
Nimar Arora, Union City, CA (US);
Edwina Lu, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 112 days.

(21) Appl. No.: 11/502,247

(22) Filed: Aug. 9, 2006

(65) Prior Publication Data
US 2008/0040369 A1 Feb. 14, 2008

(51) Int. Cl.
*G06F 7/00* (2006.01)
*G06F 17/00* (2006.01)

(52) U.S. Cl. .................. 707/626; 707/628; 707/634; 707/636; 707/637

(58) Field of Classification Search .................. None
See application file for complete search history.

(56) References Cited

U.S. PATENT DOCUMENTS

| | | | |
|---|---|---|---|
| 4,007,450 A | 2/1977 | Haibt et al. | |
| 5,261,098 A | 11/1993 | Katin et al. | |
| 5,335,346 A | 8/1994 | Fabbio | |
| 5,426,747 A | 6/1995 | Weinreb et al. | |
| 5,448,727 A | 9/1995 | Annevelink | |
| 5,473,696 A | 12/1995 | Van Breemen et al. | |
| 5,551,027 A | 8/1996 | Choy et al. | |
| 5,560,005 A | 9/1996 | Hoover et al. | |
| 5,581,758 A | 12/1996 | Burnett et al. | |
| 5,594,899 A | 1/1997 | Knudsen et al. | |
| 5,604,900 A | 2/1997 | Iwamoto et al. | |
| 5,615,367 A | 3/1997 | Bennett et al. | |
| 5,680,563 A | 10/1997 | Edelman | |

(Continued)

FOREIGN PATENT DOCUMENTS

JP 2000-132443 5/2000

(Continued)

OTHER PUBLICATIONS

"Object Serialization and Deserialization Using XML", by Bhatti et al., Advances in Data Management 2000, Tata McGraw-Hill Publishing Co.*

(Continued)

*Primary Examiner*—Jay A Morrison
(74) *Attorney, Agent, or Firm*—Hickman Palermo Truong & Becker LLP; Eric L. Sutton

(57) ABSTRACT

Instances of complex types are logically replicated. In general, the logical replication of complex types involves converting a complex type instance from its storage format into a logical representation written in a markup language, like XML. The logical representation is then propagated to a destination (or destinations), which converts the logical representation to a storage format used at the destination for that complex type.

30 Claims, 2 Drawing Sheets

U.S. PATENT DOCUMENTS

| | | | |
|---|---|---|---|
| 5,724,575 A | 3/1998 | Hoover et al. | |
| 5,729,730 A | 3/1998 | Wlaschin et al. | |
| 5,752,018 A | 5/1998 | Sheffield | |
| 5,758,083 A | 5/1998 | Singh et al. | |
| 5,765,159 A | 6/1998 | Srinivasan | |
| 5,809,297 A | 9/1998 | Kroenke et al. | |
| 5,815,710 A | 9/1998 | Martin et al. | |
| 5,832,498 A | 11/1998 | Exertier | |
| 5,907,846 A | 5/1999 | Brener et al. | |
| 5,926,819 A | 7/1999 | Doo et al. | |
| 5,937,409 A | 8/1999 | Wetherbee | |
| 5,948,062 A | 9/1999 | Tzelnic et al. | |
| 5,978,791 A | 11/1999 | Farber et al. | |
| 5,995,973 A | 11/1999 | Daudenarde | |
| 6,108,664 A | 8/2000 | Nori et al. | |
| 6,134,558 A | 10/2000 | Hong et al. | |
| 6,169,988 B1 | 1/2001 | Asakura | |
| 6,199,195 B1 | 3/2001 | Goodwin et al. | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,282,548 B1* | 8/2001 | Burner et al. | 707/104.1 |
| 6,343,287 B1 | 1/2002 | Kumar et al. | |
| 6,356,920 B1 | 3/2002 | Vandersluis | |
| 6,366,934 B1 | 4/2002 | Cheng et al. | |
| 6,442,568 B1 | 8/2002 | Velasco et al. | |
| 6,453,354 B1 | 9/2002 | Jiang et al. | |
| 6,502,098 B2* | 12/2002 | Lau | 707/100 |
| 6,691,155 B2 | 2/2004 | Gottfried | |
| 6,785,673 B1 | 8/2004 | Fernandez et al. | |
| 6,889,231 B1 | 5/2005 | Souder et al. | |
| 6,999,956 B2* | 2/2006 | Mullins | 707/2 |
| 7,031,956 B1 | 4/2006 | Lee et al. | |
| 7,096,224 B2 | 8/2006 | Murthy et al. | |
| 7,233,956 B2* | 6/2007 | Balducci et al. | 707/102 |
| 7,370,051 B2* | 5/2008 | Don et al. | 707/10 |
| 7,386,568 B2* | 6/2008 | Warner et al. | 707/102 |
| 7,555,493 B2* | 6/2009 | Khayter et al. | 707/102 |
| 7,571,160 B2 | 8/2009 | Riccardi et al. | |
| 2001/0036357 A1* | 11/2001 | Tauchi et al. | 386/95 |
| 2001/0047270 A1 | 11/2001 | Gusick et al. | |
| 2002/0073019 A1 | 6/2002 | Deaton | |
| 2002/0116457 A1 | 8/2002 | Eshleman et al. | |
| 2003/0115274 A1 | 6/2003 | Weber | |
| 2003/0182328 A1 | 9/2003 | Paquette et al. | |
| 2003/0182624 A1 | 9/2003 | Large | |
| 2003/0198214 A1 | 10/2003 | Tsukakoshi et al. | |
| 2003/0212657 A1 | 11/2003 | Kaluskar et al. | |
| 2003/0212670 A1 | 11/2003 | Yalamanchi et al. | |
| 2003/0229529 A1* | 12/2003 | Mui et al. | 705/8 |
| 2003/0236823 A1 | 12/2003 | Patzer et al. | |
| 2003/0236834 A1 | 12/2003 | Gottfried | |
| 2004/0010521 A1* | 1/2004 | Li et al. | 707/200 |
| 2004/0054686 A1* | 3/2004 | Hembry | 707/103 R |
| 2004/0088415 A1 | 5/2004 | Chandrasekar et al. | |
| 2004/0117435 A1* | 6/2004 | Rossmanith et al. | 709/202 |
| 2004/0148278 A1 | 7/2004 | Milo et al. | |
| 2004/0220946 A1 | 11/2004 | Krishnaprasad et al. | |
| 2004/0267760 A1 | 12/2004 | Brundage et al. | |
| 2005/0289125 A1 | 12/2005 | Liu et al. | |
| 2006/0036935 A1 | 2/2006 | Warner et al. | |
| 2006/0074775 A1* | 4/2006 | Roman et al. | 705/27 |
| 2006/0075006 A1 | 4/2006 | Yu et al. | |
| 2006/0095202 A1* | 5/2006 | Atarashi et al. | 701/208 |
| 2006/0143040 A1* | 6/2006 | Scheier et al. | 705/1 |
| 2006/0224702 A1* | 10/2006 | Schmidt et al. | 709/219 |
| 2007/0044012 A1 | 2/2007 | Suver et al. | |
| 2007/0061786 A1* | 3/2007 | Zhou et al. | 717/136 |
| 2008/0109447 A1* | 5/2008 | Mathur | 707/10 |
| 2008/0140705 A1* | 6/2008 | Luo | 707/103 R |
| 2008/0189617 A1* | 8/2008 | Covell et al. | 715/738 |

FOREIGN PATENT DOCUMENTS

| | | |
|---|---|---|
| JP | 2002-049517 | 2/2002 |
| WO | WO-01/42881 A2 | 6/2001 |
| WO | WO-01/59602 A1 | 8/2001 |
| WO | WO-01/61566 A1 | 8/2001 |

OTHER PUBLICATIONS

"Schema Conversion Methods between XML and Relational Models", by Lee et al., Knowledge Transformation for the Semantic Web, 2003, pp. 1-17, ISBN 1-58603-325-5.*

International Searching Authority, "Notification of Transmittal of the International Search Report or the Declaration," Application No. PCT/US03/23747, dated May 25, 2004, 6 pages.

International Preliminary Examination Report, Application No. PCT/US02/30783, pp. 1-14.

R. Bourret, et al., "A Generic Load/Extract Utility for Data Transfer Between XML Documents and Relational Databases," Proc. 2nd International Workshop on Advanced Issues of E-Commerce and Web-Based Information Systems, IEEE Computing Society, Jun. 8-9, 2000, pp. 134-143.

Mi-Ok Chae, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract, 1 page.

Oliver Gunther, et al., "MMM: A Web-Based System for Sharing Statistical Computing Modules," IEEE, May-Jun. 1997, vol. 1, Issue 3, pp. 59-68.

Kei Kurakawa, et al., "Life Cycle Design Support Based on Environmental Information Sharing," IEEE, Feb. 1-3, 1999, Proceedings EcoDesign '99, First International Symposium, pp. 138-142.

J. Shanmugasundaram, et al., "Querying XML Views of Relational Data," Proceedings of the 27th Very Large Databases Conference, Rome, Italy, Sep. 2001, pp. 261-270.

S. Vorthmann, et al., "Beyond Schemas, Schema Adjuncts and the Outside World," Markup Languages, Online!, vol. 2., No. 3, Jun. 2000, pp. 1-8.

Office Action from CN for foreign patent application No. 03821299.4 dated Dec. 24, 2007.

Current claims in CN for foreign patent application No. 03821299.4 (6 pgs).

Japanese Patent Office, "Notice of Grounds of Rejection", Patent application No. 533163/2003, mailed Aug. 19, 2008, 7 pages.

Claims, Patent application No. 533163/2003, 9 pages.

Tomoharu, Asami, "Development of Database System by XML, Relaxer, and JDBC", partial English translation, XML Press, Gijutsu-Hyohron Co., Jul. 10, 2001, vol. 3, 2 pages.

Makoto, Onizuka, "XML and Database", partial English translation, XML Magazine, Shoeisha Co., Ltd., Jul. 1, 2000, vol. 10, No. 3, 1 page.

Hironobu, Koyaku, "What is brought to SQL Server 2000 by XML?", partial English translation, Enterprise Servers, IDG Japan, Dec. 1, 2000, vol. 3, No. 12, 1 page.

* cited by examiner

USING XML FOR FLEXIBLE REPLICATION OF COMPLEX TYPES

The present application is related to U.S. patent application Ser. No. 11/416,835, entitled Efficient Replication Of XML Data In A Relational Database Management System, et al., filed on May 3, 2006 by James W. Warner, et al., the entire content of which is incorporated herein by reference.

The present application is related to U.S. patent application Ser. No. 10/259,278, entitled Mechanism For Mapping XML Schemas To Object Relational Database Systems, filed on Sep. 27, 2002 by Ravi Murthy, et al., the content of which is incorporated herein by reference.

The present application is related to U.S. patent application Ser. No. 10/308,924, entitled Asynchronous Information Sharing System, filed on Dec. 2, 2002 by Benny Souder, et al., the content of which is incorporated herein by reference.

The present application is related to U.S. patent application Ser. No. 08/961,740, entitled References That Indicate Where Global Database Objects Reside, filed on Oct. 31, 1997 by Chin-Heng Hong, et al., the content of which is incorporated herein by reference.

The present application is related to U.S. patent application Ser. No. 08/962,415, entitled Object Views For Relational Data, filed on Oct. 31, 1997 by Anil Nori, et al., the content of which is incorporated herein by reference.

FIELD OF THE INVENTION

The present invention relates to data replication, and in particular, to replicating objects.

BACKGROUND

Database replication is a way of keeping data synchronized across multiple database systems. Changes to a database are logged as events and sent via an event-based messaging system to other database systems.

Many database systems now support complex types, which are non-scalar types that include object types, collections, reference types, and opaque types. Complex types are stored in a particular storage format. For example, the storage format of an object type may be "in-line", where object type instances are stored as a serialized image in a column of a table or each attribute of the object type is stored as a scalar value in a separate column of a table, or the storage format may be "out-of-line", where a reference in a table points to another table that holds the data for instances of the object type. Instances of a collection type may be stored in-line, where a collection is stored as a serialized array image within a column of the table, or out-of-line, where an identifier representing a collection is stored in one table and each element of the collection is stored in a row of another table, each row linked to the collection via the identifier.

Storage structures that store instances of an object type in a storage format are referred to herein as base structures. Thus, for example, a table that stores objects, one or more columns in the table that store the scalar attribute values of the instances, or a column in the table that holds a serialized image of the instances, are referred to herein as base structures.

When a change occurs to a complex type instance, a change is made to the base structures. Changes to an instance are replicated by propagating the changes to the base structures. For example, at a source database, a change to an attribute of an object type instance is made by changing a row and column of a table that holds data for the attribute. The change is replicated at a destination database system by propagating the change to the column to the destination via an event-based messaging system.

Replication of complex types works well within homogenous systems. A homogenous system, as the term is used herein, is a system in which, for a given complex type, the storage format, complex type versions, and attribute ordering are the same at the sites where the object is replicated. By contrast, a heterogeneous system, as the term is used herein, is a system in which, for a complex type, a storage format, complex type version, or attribute ordering is different at the sites where the complex type is replicated.

Object replication can be problematic within heterogeneous systems for various reasons. For example, a source database system stores attribute values as scalar values in separate columns of a table. The destination database system uses a serialized image stored in a single column of a table to represent an entire object type instance. Replicating the object type by replicating changes to the base structures at the source database system does not work well because the destination database system stores instances of that object type in different base structures.

In another example, both the source and destination database systems use a serialized image to represent an object type. However, in the source database system the attributes are ordered differently than in the destination database. Thus, the database system is unable to unpickle or parse the serialized image of the same object type. Or, the attribute ordering is the same but the database systems are running different releases of the same database server software, releases that format serialized images of object type instances differently.

In another example, because of schema evolution, during which object types evolve through different versions, the same object type may evolve differently on different database systems. While the same object type may exist in different database systems, the database system may not share the same version of the object type. Thus, a source database system may generate a change for an attribute and base structure neither of which exists for that object type at the destination database system. As a consequence, the destination database system is not able to replicate changes made to an instance of that object type at the source database system.

Based on the foregoing, there is a clear need to improve object replication for heterogeneous systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
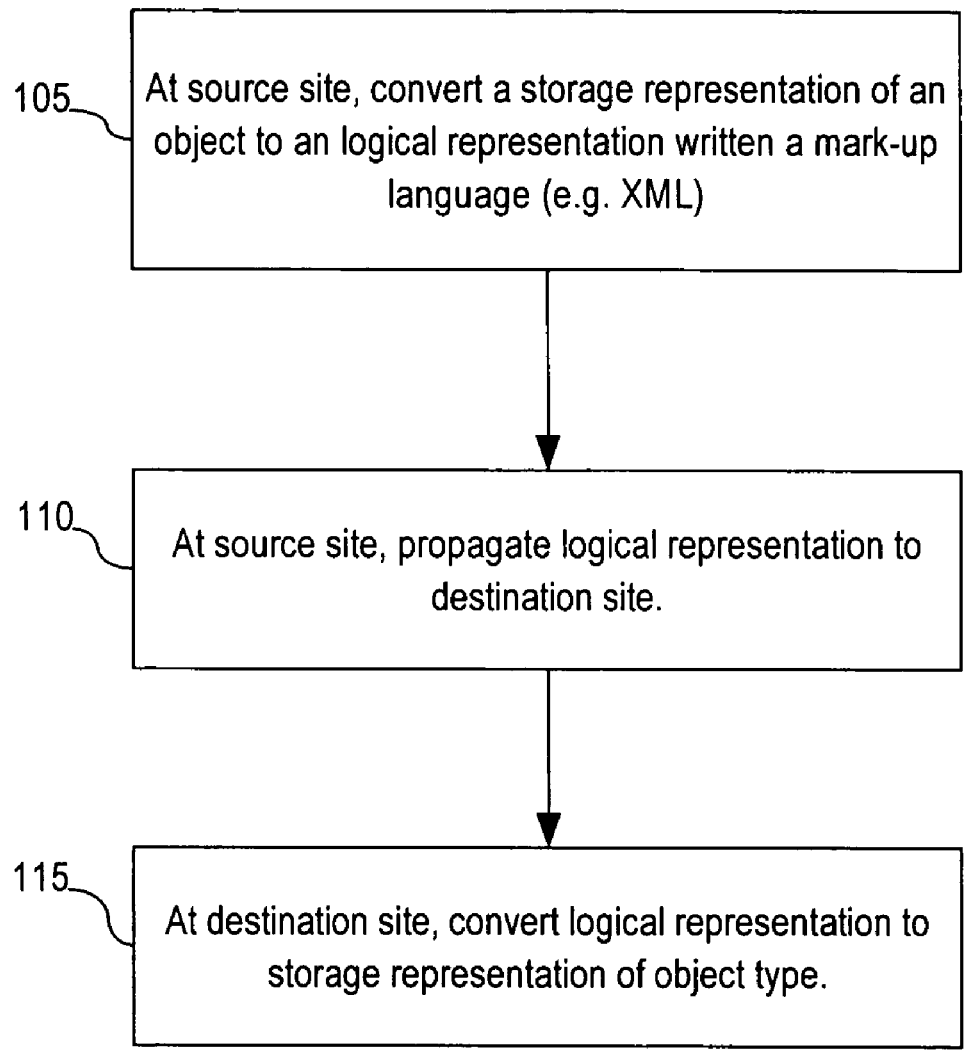
FIG. 1 is flow chart depicting a procedure for replicating objects according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques that may be used to replicate instances of complex types in a heterogeneous system. The techniques are referred to herein as the logical replication of complex types. In general, the logical replication of complex types involves converting a complex type instance from its storage format into a logical representation written in markup language, such as XML (eXtended Markup Language) or SGML (Standardized Generalized Markup Language). The particular data and structures that represent a complex type instance in the storage format are referred to herein as the storage representation. The logical representation is then propagated to a destination (or destinations), which converts the logical representation to a storage format used at the destination for that complex type.

A markup language provides for textual tags that delimit sections of a body of data, which are referred to as elements. Each element may contain one or more name-value pairs or one or more other elements.

A logical representation of a complex type describes, in a format that conforms to a markup language, attributes and attribute values of complex type instances in a way that is independent of the storage format used by a location that stores a replica of the instance. A logical representation allows communication of complex type instances in a universally understood representation while also providing the flexibility to store instances using a storage format that need not be the same at all the locations where the replica is stored.

Each site may run a different version of software (e.g. database server software) from the same or different vendors. Furthermore, development of software that uses new storage formats is not hindered by the need to maintain backward compatibility for replicating objects with older versions of software. Because both new and legacy versions of software are able to replicate logical representations of complex types, backward compatibility and forward compatibility between the versions is facilitated.

The term site is used herein to mean the location where a replicated object is stored. A source site is where an object or change thereto is originally created. The object or changes to the object are propagated to other sites, referred to herein as destination sites. Embodiments of the present invention are illustrated in the context of database systems, where a database system is a source and/or destination. However, the present invention is not so limited. A site or destination may be any computer system that participates with other computer systems to store and replicate instances of complex types.

Preferably, a logical representation is written in XML, and embodiments of the present invention are illustrated within the context of XML. However, the present invention is not limited to implementation using only XML.

An overview of the techniques is shown in FIG. 1. Referring to FIG. 1, at a source site, a complex type instance to replicate is converted to a logical representation of the complex type (105). By convert to a logical representation, it is meant that a logical representation of a complex type instance is generated. The logical representation is propagated to a destination site (110). At the destination site, the logical representation is converted to a storage representation at the destination site.

Illustrative Operating Environment

According to an embodiment of the present invention, a complex type is replicated at multiple database systems. A database system typically comprises one or more clients that are communicatively coupled to a database server that is connected to a shared database. Database server may refer collectively to a cluster of server instances and machines on which the instances execute. Generally, a server is a combination of integrated software components and an allocation of computational resources, such as memory, a node, and processes on the node for executing the integrated software components on a processor, where the combination of the software and computational resources are dedicated to providing a particular type of function on behalf of clients of the server.

Among other functions of database management, a database server governs and facilitates access to a particular database, processing requests by clients to access the database. In order for a client to interact with a server, a session is established for the client. A session, such as a database session, is a particular connection established from a client to a server, such as a database server. Through a session, the client can issue a series of requests (e.g., requests for data and/or metadata) to the database server.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting database language supported by many database servers is known as the Structured Query Language (SQL), which include proprietary forms of SQL supported by such database servers as Oracle, (e.g. Oracle Database 10g). SQL data definition language ("DDL") instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A relational or object-relational database system may be extended to provide native support for storage, management, and query of (and thus function as a repository for) particular types of data. For example, a traditional relational database system may be augmented with features and technologies to enable storage of XML documents directly in the database, and access to such XML data in either an XML-centric (e.g., using XPath and the XQuery query language) or a relationalcentric (e.g., using the SQL/XML query language) manner. Such a repository is at times referred to as an XML repository or an XML database (i.e., "XML DB").

According to an embodiment of the present invention, instances of complex types are replicated at multiple database systems that are interconnected to each other using an event-based messaging system. Each database system may store a replica of a complex type instance using a storage format that may differ from the storage format used for the complex type at another of the database systems. New instances or changes to instances made at a source database system are transmitted to the destination database systems using the messaging system.

ADT—an Illustrative Complex Type

To give an example of a complex type and how an instance is converted between a storage format and logical representation, an illustrative Abstract Data Type ("ADT") Customer_objtyp is described. An ADT is a user defined complex type that can be referenced in database statements issued to a database server and that is recognized as a complex type by the database server. A user may define an ADT by issuing DDL statements to the database server. The illustrative ADT is described herein by the following SQL DDL statements.

```
CREATE TYPE Customer_objtyp AS OBJECT (
   Custno            NUMBER,
   Custname          VARCHAR2(200),
   Address_obj       Address_objtyp,
   PhoneList_var     PhoneList_vartyp,
   ORDER MEMBER FUNCTION
      compareCustOrders(x IN Customer_objtyp) RETURN INTEGER,
   MEMBER PROCEDURE
      display
   );
where Address_objtyp is defined as
CREATE TYPE Address_objtyp AS OBJECT (
   Street            VARCHAR2(200),
   City              VARCHAR2(200),
   State             CHAR(2),
   Zip               VARCHAR2(20),
   MEMBER PROCEDURE
      display) not final;
and PhoneList_vartyp is defined as
CREATE TYPE PhoneList_vartyp AS VARRAY(10) OF
VARCHAR2(20);
```

A logical representation can be generated from the storage format by executing an XMLType constructor, which is a database statement that returns an XMLType instance. XMLType is a native built-in data type supported by some database systems which allows users to store XML data natively via the use of XMLType tables or XMLType columns. In these database systems, XMLType may be implemented as a logical data type that conforms the SQL/XML standard. The following XMLType constructor may be issued to a source database system to generate a logical representation of an ADT instance.

```
select xmltype(customer_objtyp(100, 'Mary',
   Address_objtyp('400 oracle parkway', 'redwood shores',
   'ca', '94002'), PhoneList_vartyp('650-555-1234', '650-
   555-2345'))) from dual;
```

An example of the output is as follows:

```
<CUSTOMER_OBJTYP>
   <CUSTNO>100</CUSTNO>
   <CUSTNAME>Mary</CUSTNAME>
   <ADDRESS_OBJ>
      <STREET>400 oracle parkway</STREET>
      <CITY>redwood shores</CITY>
      <STATE>ca</STATE>
      <ZIP>94002</ZIP>
   </ADDRESS_OBJ>
   <PHONELIST_VAR>
      <VARCHAR2>650-555-1234</VARCHAR2>
      <VARCHAR2>650-555-2345</VARCHAR2>
   </PHONELIST_VAR>
</CUSTOMER_OBJTYP>
```

The XMLType constructor is generated based on a mapping that maps the constructs of a logical representation to a storage format. When a logical representation is received, the logical representation is shredded and stored within the database representation according to the mapping. These mappings may be similar to those described in Mechanism For Mapping Xml Schemas To Object-Relational Database Systems, which describes mappings between constructs in a XML schema and object-relational constructs of a database representation used to store instances of the XML schema.

Handling Inheritance

Some database systems support inheritance and substitutability of complex types. Under inheritance, a complex type, such as an object type, may inherit its definition from another complex type. With respect to each other, the former complex type is referred to as a subtype and the latter as a supertype. Under substitutability, a subtype may replace or be treated as a supertype of the subtype.

For example, an object type US_ADDRESS_OBJTYP is defined as a subtype of ADDRESS_OBJTYP, using the following DDL statement,

```
CREATE TYPE US_ADDRESS_OBJTYP under
   ADDRESS_OBJTYP (county varchar2(200)
   );
```

The DDL statement defines an additional attribute county for ADDRESS_OBJTYP.

In a logical representation, elements and attributes correspond to attributes of complex types. Based only on this information, it may be difficult or impossible to determine whether the logical representation represents a subtype or its supertype.

For example, a table that is replicated at both a source and destination database system has a column typed as ADDRESS_OBJTYP. Under substitutability, the column may store instances of ADDRESS_OBJTYP or instances of its subtype US_ADDRESS_OBJTYP.

To replicate an instance within the column, a logical representation is transmitted to the destination database system. The logical representation contains no element corresponding to county, an attribute defined for US_ADDRESS_OBJTYP but not its supertype ADDRESS_OBJTYP. The absence of such an element may be the result of the logical representation representing an instance of ADDRESS_OBJ or representing an instance of subtype US_ADDRESS_OBJTYP that has no value for county. Thus, it is not possible to discern solely from the absence of such an element whether the logical representation represents either an instance of ADDRESS_OBJTYP or US_ADDRESS_OBJTYP.

To identify the particular type represented by the logical representation, a logical representation may be annotated with information identifying the specific type of the instance represented by the logical representation. Such an annotation is referred to herein as a type annotation. According to an embodiment of the present invention, a type annotation may be an attribute within a name space. To illustrate, fragments of logical representations CUST_ADDRESS and CUST_US_ADDRESS are provided below.

---
CUST_ADDRESS
<CUSTOMER_OBJTYP xmlns:ora="http://xmlns.oracle.com/xdb">
   <CUSTNO>100</CUSTNO>
   <CUSTNAME>Mary</CUSTNAME>
   <ADDRESS_OBJ ora:schemaname="PO"
     ora:typename="ADDRESS_OBJTYP" >
   <STREET>400 oracle parkway</STREET>....
CUST_US_ADDRESS
<CUSTOMER_OBJTYP xmlns:ora="http://xmlns.oracle.com/xdb">
   <CUSTNO>100</CUSTNO>
   <CUSTNAME>Mary</CUSTNAME>
   <ADDRESS_OBJ ora:schemaname="PO"
     Ora:typename="US_ADDRESS_OBJTYP">
   <STREET>400 oracle parkway</STREET>...

---

CUST_ADDRESS and CUST_US_ADDRESS both represent an instance of CUSTOMER_OBJTYP. However, CUST_ADDRESS includes an instance of supertype ADDRESS_OBJTYP while CUST_US_ADDRESS includes an instance of subtype US_ADDRESS_OBJTYP. In CUST_ADDRESS, the attributes ora:schemaname="PO" ora:typename="ADDRESS_OBJTYP" on the ADDRESS_OBJ element, together identify the supertype ADDRESS_OBJTYP. In US_CUST_ADDRESS, the attributes ora:schemaname="PO" typename="US_ADDRESS_OBJTYP" together identify the subtype US_ADDRESS_OBJTYP.

The annotation may only be needed when replicating a complex type where a possibility of substitution exists. For example, to replicate an object stored in a column typed as an object type, and no subtype is defined for the object type among the replication sites, then there is no need to use a type annotation in a logical representation of the object.

Site Specific Components

Complex types may have a "site-specific component" whose value domain (i.e. set of possible values) is tied to or is only semantically relevant to a specific site. Such components are called site-specific components. One example of such a component is an object reference. An object reference is information that identifies another object. An object references may contain an object-id and supplementary information about the storage location of the object. For example, a type of object reference, referred to herein as a table-id object reference, includes an object-id and a numeric table-id identifying the table that holds the referred to object. The object-id is unique to the object being replicated and every replica of the object is associated with the object-id. The table id is a number assigned by a database system to a database object within a schema. A complex type LINEITEM_OBJTYP is replicated at multiple database systems using the same storage format, that is, a table LINEITEM is used to store replica instances of the objects at each of the sites. While all sites may use LINEITEM_OBJTYP, the table-id assigned to the table may differ between sites. Table-id object references for objects in LINEITEM may not be useful or correct for another site. Therefore, there is a need for a mechanism that allows replication sites to communicate and convert site-specific components of complex types, such as table-id object references.

One such approach is to convert the site specific domain values used for site specific components to a logical representation that is universally recognized by replication sites. For example, for table-id object references, a table-id may be converted to a logical representation that represents and identifies the table by using elements and or attributes that include the schema name and table name of the table.

This approach is illustrated using two types of table-id object references. The first type uses an object-id that is generated to be globally unique among a set of database systems. An example of an object reference value that refers to an instance of LINEITEM_OBJTYP is as follows.

---
0000280209047490E8C5082A7380000

---

The emboldened portion of the object reference value is a table identifier identifying table LINEITEM at a particular site. The following is a logical representation LINE_ITEM of the object after conversion.

---
LINE_ITEM

<LINEITEM_OBJTYP ...>
...
<STOCK_REF ora:schemaname="PO"
  ora:tablename="LINEITEM">0000280209047490E8C5082
</STOCK_REF>
...

---

The attributes ora:schemaname="PO" ora:tablename="LINEITEM" logically represent table LINEITEM by its table name and schema name.

Another type of location information that may be included in an object reference is a row-id. The row-id of the rows that store a replica of an object may differ between replication sites. When converting an object reference to a logical representation, the row-id is ignored and may not be included with the logical representation.

Another type of reference is a primary key reference. A primary key reference refers to an object stored in an object table. One or more columns that hold an attribute of the objects serve as a primary key for the objects. A primary key object reference contains primary key values to identify the object referred to. A primary key reference may also contain location information, such as a table-id, which is site specific. The table-id also needs to be converted to a logical representation universally recognized among the replication sites as referring to the table.

For example, an object table StockItem stores objects having a primary key based on columns stockno and price in StockItem_objtyp. A primary key reference STOCK_REF with a table id referring to StockItem_objtyp is converted to logical representation STOCK_ITEM, as follows:

---
STOCK_ITEM

<STOCK_REF ora:schemaname="schema" ora:tablename="StockItem">
  <STOCKNO>1003</STOCKNO>

-continued

| STOCK_ITEM |
| --- |
| <PRICE>304</PRICE><br></STOCK_REF> |

Converting Opaque Types

Opaque types are types whose structure is not known to the database system. Instances of the opaque types are referred to herein as opaque objects. A user registers with database system routines for handling the opaque type. This differs from native or user defined types, in which native software of a database server manipulates or accesses the object to perform such tasks as pickling and unpickling between persistent storage and volatile memory, reading and setting attributes, and performing compare operations. Instead, the user registers the routines for performing such operations.

According to an embodiment of the present invention, a user may also register routines for conversion of opaque type instances to and from logical representations. To create a logical representation of an opaque type instance at a source site, a user registered function registered for the opaque type is invoked. To convert a logical representation to an opaque type instance to store at a destination site, a user registered function registered for the opaque type is invoked.

Attribute Ordering

The order of the attributes of an object type may differ between a source and destination site. The source site may generate a logical representation using an attribute order defined for the object type at the source site. According to an embodiment, when the destination site converts the logical representation, it reorders the attributes to the attribute order defined for the object type as the destination site.

Leveraging the Power of XML Technology

Once an object instance is represented by a logical representation in XML, the power and XML technology and/or markup language may be used to process and manipulate the logical representation. XQuery and XPath may be used to read the logical representations and XSLT may be used to transform the logical representations. These technologies are tools that may be used to handle differences between complex types that occur at the logical level, due to, for example, schema evolution and attribute ordering.

For example, an object type at a source site has evolved so that the object type includes, in addition to attributes A and B, a new attribute C. New attribute C has not been added to the object type definition at the destination site. When the destination site receives a logical representation of an instance of the object type, XSLT transforms are executed to remove elements corresponding to the attribute C. An XSLT transform may also be executed at the destination site to reorder the attributes of the logical representation to the order used by the destination site.

Hardware Overview

Figure 2:
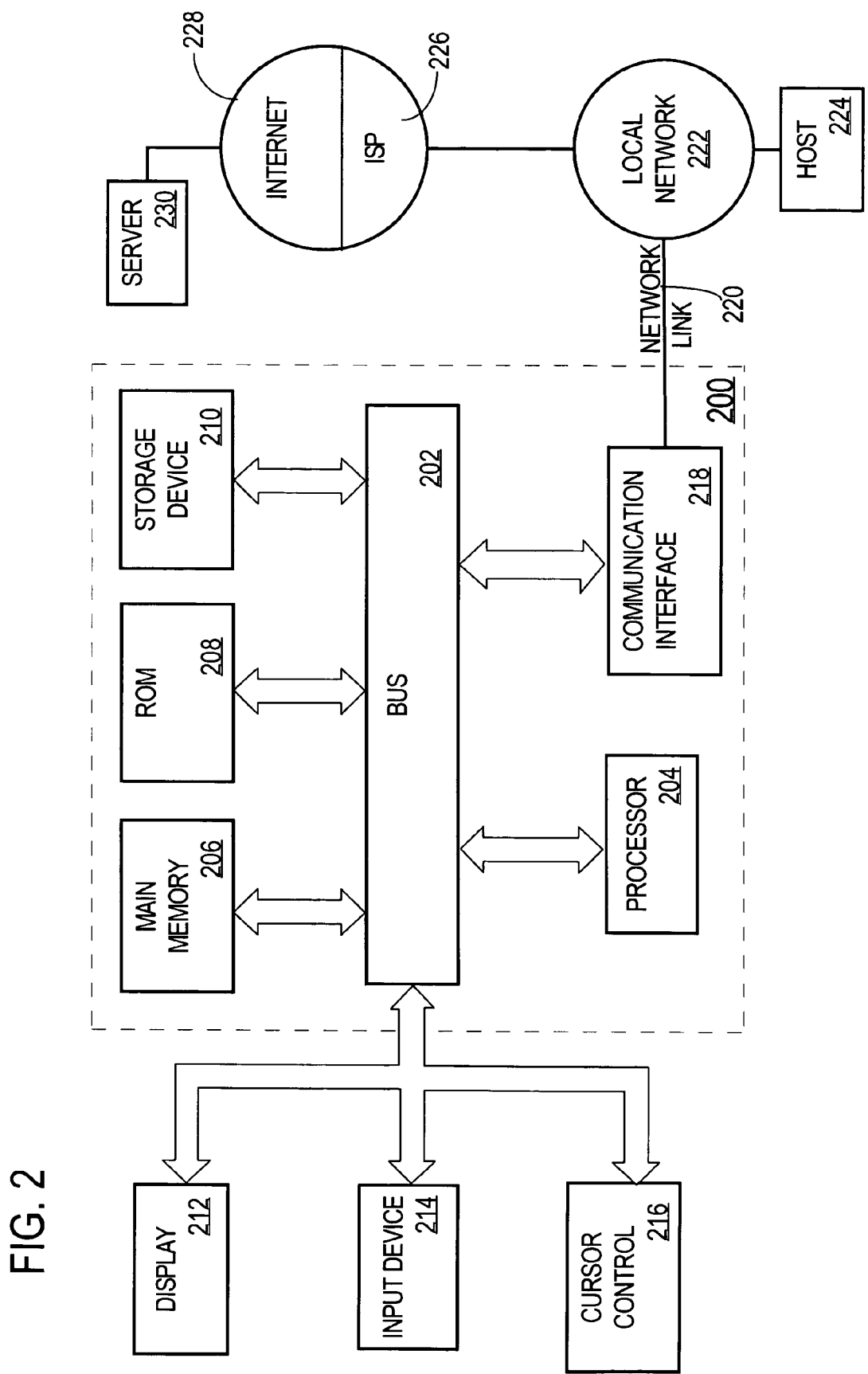
FIG. 2 is a diagram of computer system that may be used in an implementation of an embodiment of the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method of replicating objects at multiple sites, the method comprising the steps of:
converting an instance of a complex type from (a) a first storage format within a first database used at a source site to store the instance of the complex type to (b) a logical representation tat conforms to a markup language and is recognized among the multiple sites;
propagating said logical representation to at least one destination site; and
at a destination site, converting said logical representation to a second storage format used to store instances of the complex type within a second database at the destination site, said second storage format different from said first storage format;
wherein the instance of die complex type in the first storage format within the first database at the source site includes an object identifier that identifies at least part of the instance of the complex type at the source site, wherein the object identifier is tied to the source site and is not used to identify the at least part of the instance of the complex type in the second storage format within the second database at the destination site, and wherein the logical representation includes a globally unique identifier that is recognized among the multiple sites as representing the at least part of the instance of the complex type;
wherein the steps of converting the instance, propagating the logical representation, and converting said logical representation are performed by one or more computing devices.

2. The method of claim 1, wherein the step of converting the instance includes incorporating within said logical representation information that identifies the type of the complex type.

3. The method of claim 1, wherein the steps further include determining that there is a subtype defined for said complex type; and
in response to determining that there is a subtype defined for said complex type, incorporating within said logical representation information that identifies the subtype.

4. The method of claim 1, wherein
the step of converting the instance includes:
generating a logical representation for said object identifier that is recognized among the multiple sites, and
incorporating said logical representation of said object identifier within said logical representation of said complex type.

5. The method of claim 1, wherein:
said object identifier comprises a table identifier, said table identifier identifying a table at said source site, and wherein said table identifier is not used to identify the table at the destination site;
generating said globally unique identifier of said table identifier that is recognized among the multiple sites as said table; and
incorporating said globally unique identifier within said logical representation of said complex type.

6. The method of claim 5, wherein said logical representation includes a table name of said table.

7. The method of claim 5, wherein:
said table is an object table of an object type;
wherein one or more columns of said object table are primary keys for instances of said object type stored in said object table; and
wherein said logical representation includes a representation of a value for each of said one or more columns.

8. The method of claim 1, wherein said complex type is an opaque type.

9. The method of claim 8, wherein:
converting said instance of said complex type includes invoking a user registered function registered to convert instances of said complex type to logical representations of said instances; and
converting said logical representation to said second storage format includes invoking a user registered function registered to convert logical representations of instances of said complex type to said second storage format.

10. The method of claim 1, wherein:
said source site defines a first version of said complex type;
said destination site defines a second version of said complex type; and
further comprising:
converting said logical representation to a second storage format used to store instances of the complex type within the second database includes transforming said logical representation to represent said second version of said complex type.

11. The method of claim 10, wherein transforming includes changing the order of attributes within said logical representation.

12. The method of claim 10, wherein transforming includes adding or removing attributes not defined by said second version.

13. The method of claim 10, wherein execution of instructions that conform to one or more XML languages causes said transforming said logical representation.

14. The method of claim 13, wherein said one or more XML languages include at least one language from a set languages that include XSLT and XQuery.

15. The method of claim 1, wherein said markup language is either XML or SGML.

16. A non-transitory volatile or non-volatile machine-readable storage medium storing one or more sequences of instructions which, when executed by one or more processors, causes the one or more processors to perform:
converting an instance of a complex type from (a) a first storage format within a first database used at a source site to store the instance of the complex type to (b) a logical representation that conforms to a markup language and is recognized among multiple sites;
propagating said logical representation to at least one destination site; and
at a destination site, converting said logical representation to a second storage format used to store instances of the complex type within a second database at the destination site, said second storage format different from said first storage format;
wherein the instance of the complex type in the first storage format within the first database at the source site includes an object identifier that identifies at least part of the instance of the complex type at the source site, wherein the object identifier is tied to the source site and is not used to identify the at least part of the instance of the complex type in the second storage format within the second database at the destination site, and wherein the logical representation includes a globally unique identifier that is recognized among the multiple sites as representing the at least part of the instance of the complex type.

17. The volatile or non-volatile machine-readable storage medium of claim 16, wherein one or more sequences of instructions causes the one or more processors to perform converting the instance by incorporating within said logical representation information that identifies the type of the complex type.

18. The volatile or non-volatile machine-readable storage medium of claim 16, wherein the one or more sequences of instructions further causes the one or more processors to perform:
determining that there is a subtype defined for said complex type; and
in response to determining that there is a subtype defined for said complex type, incorporating within said logical representation information that identifies the subtype.

19. The volatile or non-volatile machine-readable storage medium of claim 16, wherein the one or more sequences of instructions causes the one or more processors to perform converting the instance by:
generating a logical representation for said object identifier that is recognized among the multiple sites, and
incorporating said logical representation of said object identifier within said logical representation of said complex type.

20. The volatile or non-volatile machine-readable storage medium of claim 16, wherein said object identifier comprises a table identifier, said table identifier identifying a table at said source site, and wherein said table identifier is not used to identify the table at the destination site; and wherein the one or more sequences of instructions further causes the one or more processors to perform:
generating said globally unique identifier of said table identifier that is recognized among the multiple sites as said table; and
incorporating said globally unique identifier within said logical representation of said complex type.

21. The volatile or non-volatile machine-readable storage medium or claim 20, wherein said logical representation includes a table name of said table.

22. The volatile or non-volatile machine-readable storage medium of claim 20, wherein said table is an object table of an object type;
wherein one or more columns of said object table are primary keys for instances of said object type stored in said object table; and
wherein said logical representation includes a representation of a value for each of said one or more columns.

23. The volatile or non-volatile machine-readable storage medium of claim 16, wherein said complex type is an opaque type.

24. The volatile or non-volatile machine-readable storage medium of claim 23,
wherein the one or more sequences of instructions causes the one or more processors to perform converting said instance of said complex type by invoking a user registered function registered to convert instances or said complex type to logical representations of said instances; and
wherein the one or more sequences of instructions causes die one or more processors to perform converting said logical representation to said second storage format by invoking a user registered function registered to convert logical representations of instances of said complex type to said second storage format.

25. The volatile or non-volatile machine-readable storage medium of claim 16, wherein said source site defines a first version of said complex type;
wherein said destination site defines a second version of said complex type; and wherein the one or more sequences of instructions causes the one or more processors to perform converting said logical representation to the second storage format by transforming said logical representation to represent said second version of said complex type.

26. The volatile or non-volatile machine-readable storage medium of claim 25, wherein the one or more sequences of instructions causes the one or more processors to perform transforming by changing an order of attributes within said logical representation.

27. The volatile or non-volatile machine-readable storage medium of claim 25, wherein the one or more sequences of instructions causes the one or more processors to perform transforming by adding or removing attributes not defined by said second version.

28. The volatile or non-volatile machine-readable storage medium of claim 25, wherein execution of instructions that conform to one or more XML languages causes said transforming said logical representation.

29. The volatile or non-volatile machine-readable storage medium of claim 28, wherein said one or more XML languages include at least one language from a set languages that include XSLT and XQuery.

30. The volatile or non-volatile machine-readable storage medium of claim 16, wherein said markup language is either XML or SGML.

* * * * *

UNITED STATES PATENT AND TRADEMARK OFFICE
CERTIFICATE OF CORRECTION

| | | |
|---|---|---|
| PATENT NO. | : 7,801,856 B2 | Page 1 of 1 |
| APPLICATION NO. | : 11/502247 | |
| DATED | : September 21, 2010 | |
| INVENTOR(S) | : James W. Warner et al. | |

It is certified that error appears in the above-identified patent and that said Letters Patent is hereby corrected as shown below:

In column 1, line 11, delete "Object Relational" and insert -- Object-Relational --, therefor.

In column 12, line 7, in claim 1, delete "tat" and insert -- that --, therefor.

In column 12, line 16, in claim 1, delete "die" and insert -- the --, therefor.

In column 14, line 35, in claim 21, delete "or" and insert -- of --, therefor.

In column 14, line 54, in claim 24, delete "or" and insert -- of --, therefor.

In column 14, line 58, in claim 24, delete "die" and insert -- the --, therefor.

Signed and Sealed this
Sixteenth Day of August, 2011

David J. Kappos
*Director of the United States Patent and Trademark Office*